US010280683B1

(12) United States Patent
Smid (10) Patent No.: US 10,280,683 B1
(45) Date of Patent: *May 7, 2019

(54) MUD MOTOR APPARATUS AND SYSTEM (71) Applicant: John P. Smid, Houston, TX (US)

(72) Inventor: John P. Smid, Houston, TX (US)

(73) Assignee: National Oilwell DHT, LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/179,571

(22) Filed: Jun. 10, 2016

Related U.S. Application Data (60) Provisional application No. 62/174,711, filed on Jun. 12, 2015.

(51) Int. Cl.
| | |
|---|---|
| *F01C 1/10* | (2006.01) |
| *F03C 2/00* | (2006.01) |
| *F03C 4/00* | (2006.01) |
| *F04C 2/00* | (2006.01) |
| *E21B 4/00* | (2006.01) |
| *E21B 4/02* | (2006.01) |
| *F16B 7/04* | (2006.01) |
| *F04C 2/107* | (2006.01) |
| *F04C 15/00* | (2006.01) |
| *F16D 3/38* | (2006.01) |
| *F16D 3/32* | (2006.01) |
| *F16D 3/205* | (2006.01) |

(52) U.S. Cl.
CPC .............. *E21B 4/003* (2013.01); *E21B 4/02* (2013.01); *F04C 2/1073* (2013.01); *F04C 15/0073* (2013.01); *F04C 15/0076* (2013.01); *F16B 7/042* (2013.01); *F16D 3/205* (2013.01); *F16D 3/2052* (2013.01); *F16D 3/32* (2013.01); *F16D 3/38* (2013.01)

(58) Field of Classification Search
CPC .... F04C 2/1071; F04C 2/1073; F04C 2/1075; F04C 15/0073; F04C 15/0076; F04C 29/0078; F16D 3/16; F16D 3/205; F16D 3/32; F16D 3/38; F16D 3/40; F16D 3/2052; F16D 3/2055; E21B 4/02; E21B 4/003
USPC ........... 418/48, 152; 464/119, 114, 116, 136, 464/155
See application file for complete search history.

(56) References Cited

U.S. PATENT DOCUMENTS

| 2,499,030 | A | * | 2/1950 | Moon | ................ F16D 3/38 464/119 |
| 3,539,279 | A | * | 11/1970 | Rider | ................ F04C 2/1071 418/48 |
| 3,800,555 | A | * | 4/1974 | Arneson | ................ F16D 3/32 464/114 |

(Continued)

FOREIGN PATENT DOCUMENTS

| DE | 19530978 A1 | * | 2/1997 | ............ F04C 2/1071 |
| GB | 2377256 A | * | 1/2003 | ............ F04C 15/0065 |
| JP | 02181081 A | * | 7/1990 | ............ F04C 2/1071 |

*Primary Examiner* — Theresa Trieu
(74) *Attorney, Agent, or Firm* — Phillips Murrah PC; Martin G. Ozinga (57) ABSTRACT The present invention is an apparatus, system and method for use of a mud motor having a bearing assembly a transmission or coupling assembly, a power section, a rotor catch assembly, and a cross over sub-valve wherein the transmission assembly may have a torque and thrust transfer coupling with a safetied joint for contacting universal style joints.

6 Claims, 8 Drawing Sheets (56) References Cited

U.S. PATENT DOCUMENTS

| | | | | |
|---|---|---|---|---|
| 5,288,271 A | * | 2/1994 | Nelson | F16D 3/32 |
| | | | | 464/114 |
| 7,473,082 B2 | * | 1/2009 | Marielle | F04C 2/1071 |
| | | | | 418/48 |
| 2014/0224545 A1 | * | 8/2014 | Nicol-Seto | F16D 3/40 |
| | | | | 464/136 |

* cited by examiner

MUD MOTOR APPARATUS AND SYSTEM

CROSS-REFERENCE TO RELATED APPLICATIONS

Priority is claimed from U.S. Provisional Patent Application Ser. No. 62/174,711 filed on Jun. 12, 2015 and incorporated by referenced herein.

BACKGROUND OF INVENTION

1. Field of the Invention

In general, the present invention relates to a device, system and method of using a new and improved mud motor. More particularly, the present invention provides a mud motor with a transmission having a torque and thrust transfer coupling with a pull load safety.

2. Description of the Prior Art

A mud motor or drilling motor is typically a progressive cavity positive displacement motor placed in the drill string to provide additional power to the bit while drilling or rotate the drill bit while the drill string is sliding. Mud motors are frequently utilized in directional drilling applications in horizontal wells, but they are also utilized in straight vertical wells where increased performance is desired.

As the desired drill bit motion is purely rotational, a transmission is required to convert the rotation and translation of the mud motor power section rotor to pure rotation at the bit. The motor uses drilling fluid commonly referred to as drilling mud or just mud to create rotating and translating eccentric motion in the power section of the motor, which is transferred as rotating power to the drill bit. In other words, as fluid is driven through the power section of a mud motor, the rotor spins but also translates as the rotor lobes move from one stator cavity to the next.

Because of the curves needed to be built in directional drilling, the transmission in the mud motor must feature a bend angle in its assembly. This bend angle must be accommodated by the mud motor transmission as well as the translate of the power section rotor. Current transmission designs that allow for some degree of bending, generally fall into three categories, a constant velocity, also referred to as a CV joint, jaw clutch coupling, and flex shafts.

Constant velocity joint transmissions very generally utilize cylindrical pockets in the coupling that create the female portion of the coupling interface. Spherical pockets in the shaft hold the balls. The balls allow torque between the coupling and shaft. The spherical thrust reaction interface allows the shaft to rock back and forth relative to the coupling while both rotate together. To complete the assembly, this same coupling to shaft interface is found at each end of the shaft. An advantage is that they may be smooth running and generally an efficient torque transfer. However, a weakness and or limitation are that the point and line contact interfaces generate high stresses in the joint.

Jaw clutch couplings generally provide enough clearance at this interface to allow a three degree misalignment between the sides of the coupling interface. With enough play between the parts, the input end can rotate and translate with the power section and the output end can simply rotate. An advantage may be that they are simple, easily repaired, and have higher damage tolerance. A weakness and or limitation are that they exhibit clunky operations and the point and line contacts generate high stresses in the joint.

The flex shaft coupling relies upon a long shaft. It is generally long enough that it can withstand the three degree misalignment between the input and output and rotate and translate with the power section while keeping stresses low. Since the motion of the power section is a given deflection input, the design principle here is reduce the bending stiffness of a deflecting member to reduce the stress in the deflecting member such that it can survive fatigue loading for an adequate length of time. An advantage may be that they run smooth and are the simplest assembly. A weakness and or limitation are that the shafts must be long to manage fatigue.

Furthermore, expensive exotic materials such as titanium are often used and shafts are still prone to failure in bending fatigue.

The current mud motor transmissions on the market have known torque transfer and life limitation, which limits the drilling industry and prior art attempts at improvements to this problem have not provided the desired solutions. Thus, there is a need for an apparatus, process and or system that provides a new mud motor with an improved transmission. The above discussed limitations in the prior art is not exhaustive. The current invention provides an inexpensive, time saving, more reliable apparatus, method and system where the prior art fails.

SUMMARY OF THE INVENTION

In view of the foregoing disadvantages inherent in the known types of mud motor transmissions now present in the prior art, the present invention provides a new and improved apparatus, system and method of using the same. As such, the general purpose of the present invention, which will be described subsequently in greater detail, is to provide a new and improved mud motor and mud motor transmission, which has all the advantages of the prior art devices and none and or fewer of the disadvantages.

It is, therefore, contemplated that the present invention is an apparatus, system and method for use of a mud motor having a bearing assembly, a transmission or coupling assembly, a power section, a rotor catch assembly and a cross over sub-valve. It is contemplated that transmission assembly may have a torque and thrust transfer coupling with the pull load safety device.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved mud motor and or mud motor transmission wherein the system stresses are lower than currently used coupling systems, which may lead to longer component life, ability to run higher torque and horsepower mud motor power sections, and have fewer field failures.

Furthermore, an object of the present invention is to provide a new and improved mud motor and or mud motor transmission apparatus, system and method, which provides enclosed structures to reduce bending stress and face loaded torque assemblies in a frictional universal joint arrangement.

Another object of the present invention is to provide a new and improved mud motor and or mud motor transmission apparatus, system and method that will provide a frictional universal joint arrangement with a closed box support structural arrangement and may provide double shear catch pins.

It is a further object of the present invention to provide a new and improved mud motor and or mud motor transmission apparatus, system and method, which is of a durable and reliable construction and may be utilized in numerous types of drilling operations.

An even further object of the present invention is to provide a new and improved mud motor and or mud motor transmission apparatus, system and method, which is susceptible to a low cost of installation and labor, which accordingly is then susceptible to low prices of sale to the consuming industry, thereby making such a system economically available to those in the field.

Still another object of the present invention is to provide a new and improved mud motor and or mud motor transmission apparatus, system and method, which provides all of the advantages of the prior art while simultaneously overcoming some of the disadvantages normally associated therewith.

These, together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings and appendices.

DETAILED DESCRIPTION OF INVENTION

Referring to the illustrations, drawings, and pictures, reference character 10 generally designates a new and improved mud motor and or mud motor transmission apparatus, system and method of using same constructed in accordance with the present invention. Invention 10 is generally used in drilling operations such as but not limited to horizontal directional drilling although it is understood that vertical drilling is also contemplated. For purposes of convenience, the reference numeral 10 may generally be utilized for the indication of the invention, portion of the invention, preferred embodiments of the invention and so on.

Figure 1:
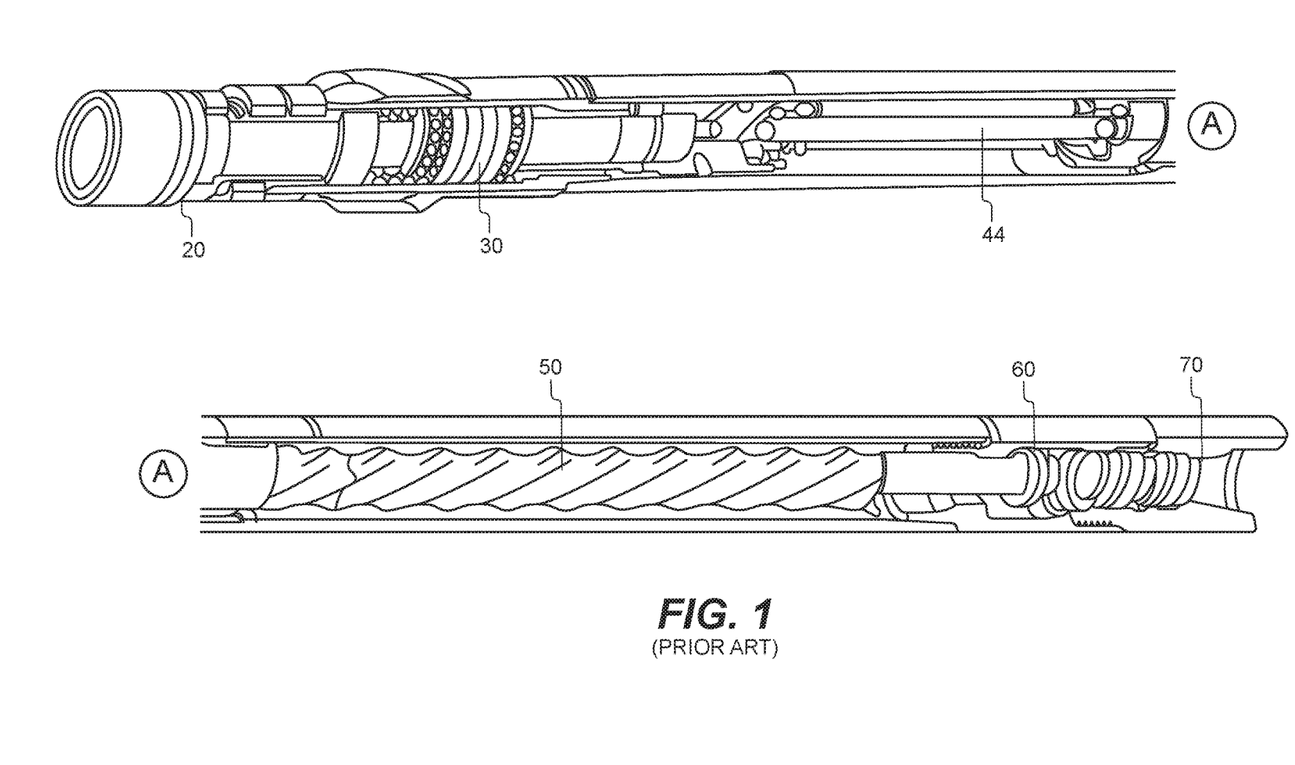
FIG. 1 is a general illustration of a prior art device depicting a mud motor.
Figure 2:
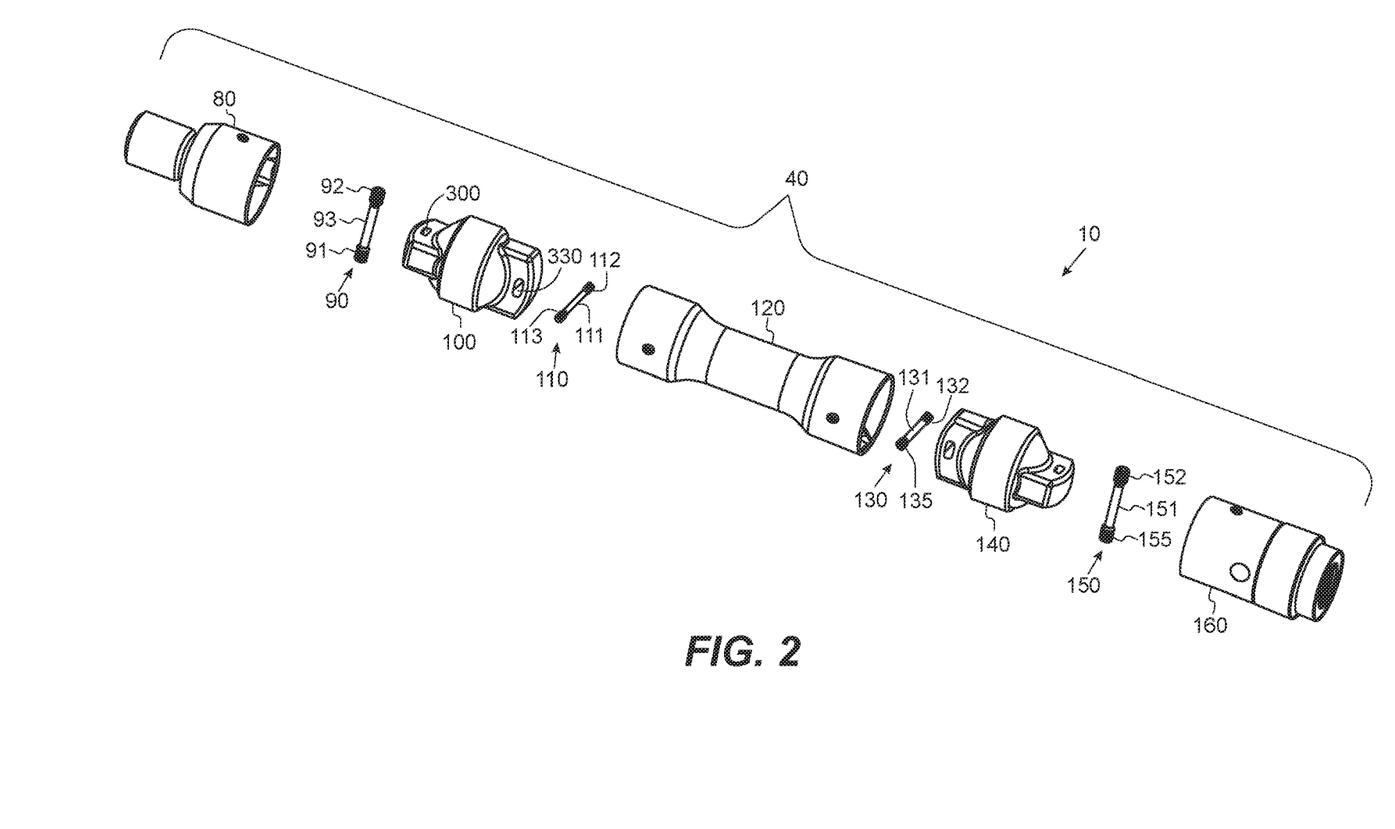
FIG. 2 is a general illustration of a preferred embodiment in accordance with the current invention depicting an exploded transmission for a mud motor.

Referring to the illustrations and more in particular to FIGS. 1 and 2, mud motor 20 may generally comprise a bearing assembly 30, a transmission or coupling assembly 44, a power section 50, a rotor catch assembly 60, and a cross over sub-valve 70. It is understood that transmission 44 depicted in FIG. 1 is a prior art transmission and not part of invention 10.

Invention 10 contemplates a transmission assembly 40 as generally depicted in the exploded view in FIG. 2 and may generally be located between bearing assembly 30 and power section 50. Transmission assembly 40 may include input coupling 80, a first pin assembly 90, a first torque and thrust transfer coupling 100, a second pin assembly 110, an intermediate shaft 120, a third pin assembly 130, a second torque and thrust transfer coupling 140, a forth pin assembly 150, an output coupling 160, and so forth.

First pin assembly 90 may include pin 93, first set screw 91, second set screw 92 and so forth. Second pin assembly 110, may include pin 111, first set screw 112, second set screw 113 and so forth. Third pin assembly 130, may include pin 131, first set screw 132, second set screw 135 and so forth. Fourth pin assembly 150, may include pin 151, first set screw 152, second set screw 155 and so forth. It is understood that pin assemblies may be of numerous configuration and may or may not be identical. It is understood that the current invention should not be limited to the illustrations.

Figure 3:
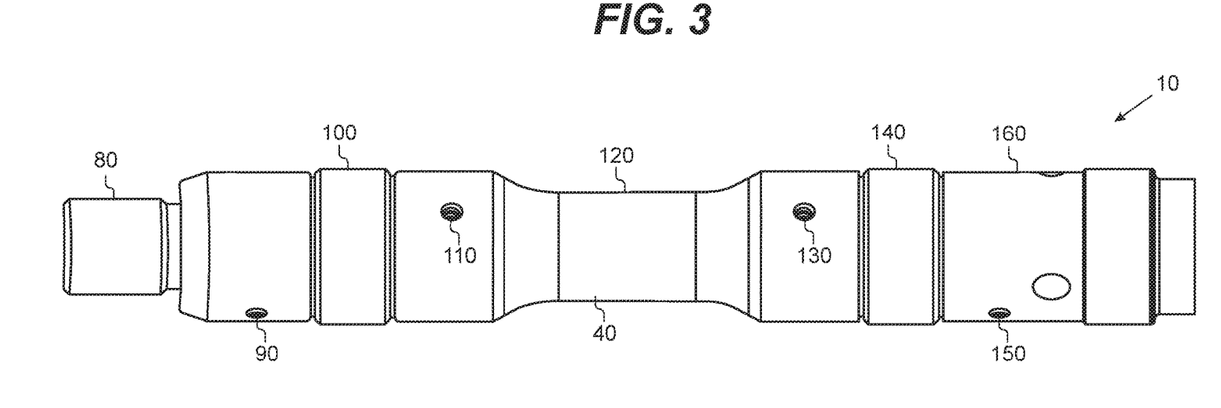
FIG. 3 is a general illustration of a preferred embodiment in accordance with the current invention depicting a perspective view of a transmission for a mud motor.
Figure 4:
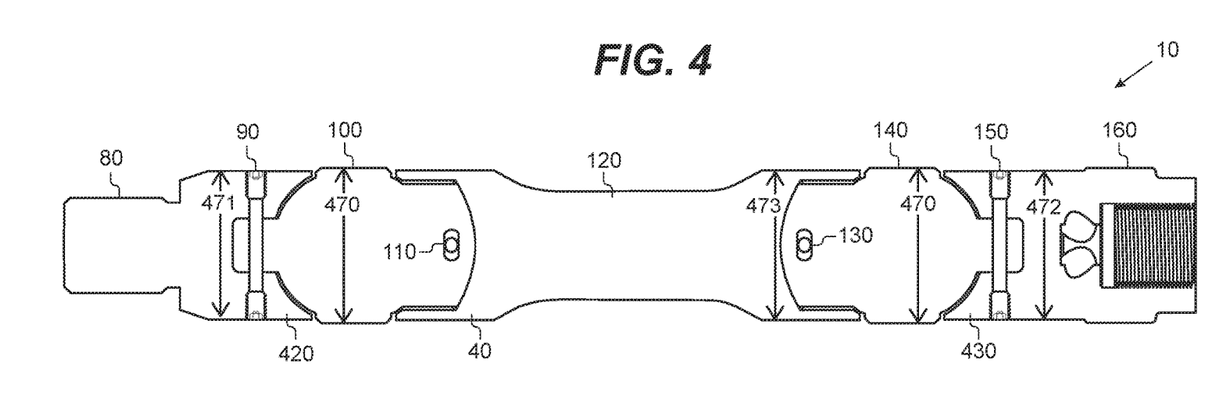
FIG. 4 is a general illustration of a preferred embodiment in accordance with the current invention depicting a cross section of a transmission for a mud motor.

Again referring to the illustrations and more in particular to FIGS. 3 and 4, invention 10 contemplates a safetied face contacting universal style joint that has similarities to the prior art advantages over same. It is understood that invention 10 may run as smoothly as a CV joint but have the capacity to carry more than twice the load of the prior art.

Figure 5:
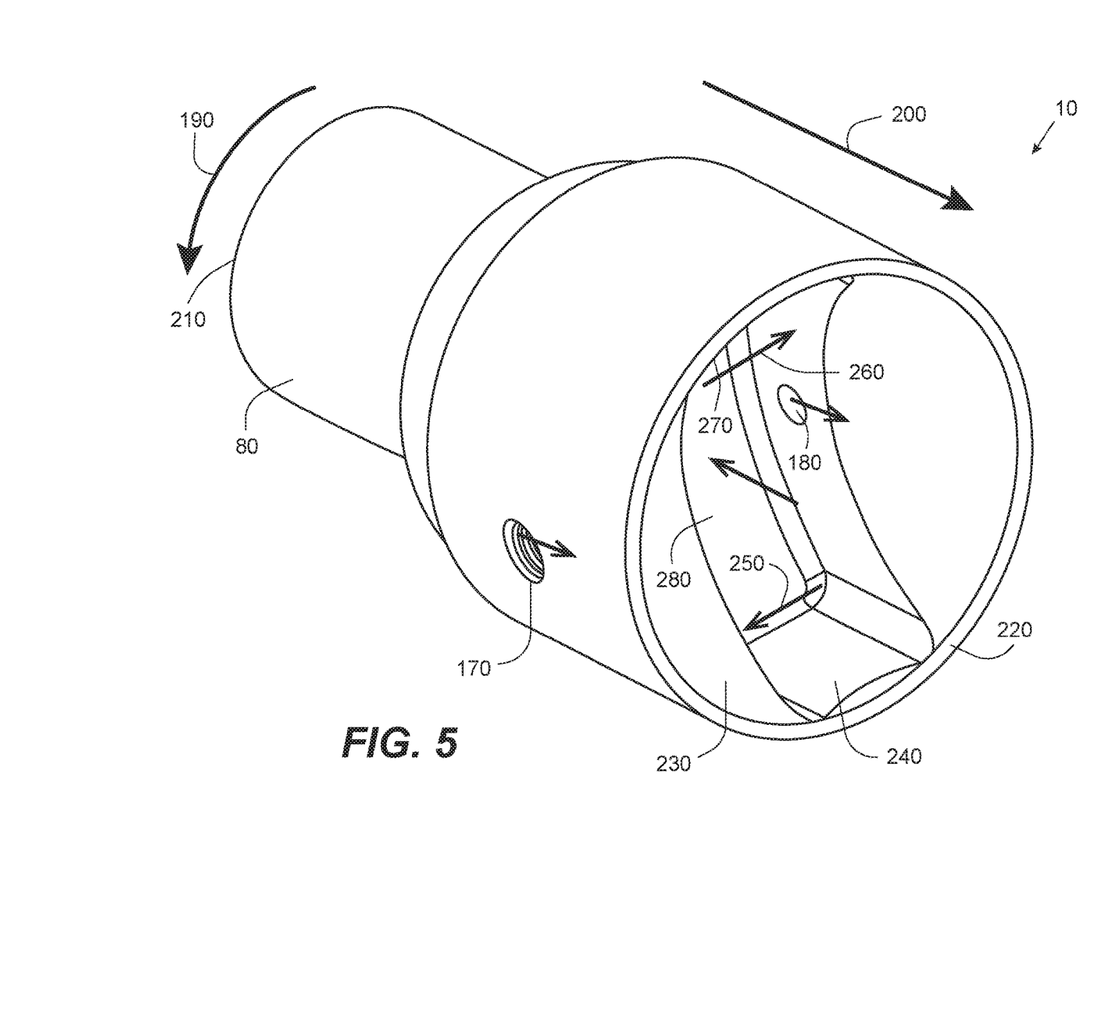
FIG. 5 is a general illustration of a preferred embodiment in accordance with the current invention depicting an input coupling of a transmission for a mud motor.

FIG. 5 is a general illustration of input coupling 80 depicting safety pin interface holes and or apertures 170 and 180, input torque rotation 190, and input thrust load 200. Input coupling 80 generally has a first end 210 for attaching to power section 50 and a second end 220 having a recessed area 230 adapted to receive first transfer coupling 100. It is contemplated that recessed area 230 generally has a torque facing such as but not limited to first side face 240, second side face 250, third side face 260, and fourth side face 270. It is contemplated first side face 240 and fourth side face 270 may not carry torque. Recessed area 230 also has a thrust face 280. It is understood in case the need to pull on the input coupling 80 in the direction opposite input thrust load 200, axial load is reacted on the safety pin and or pin assembly 90 and associated apertures 170 and 180.

Figure 6:
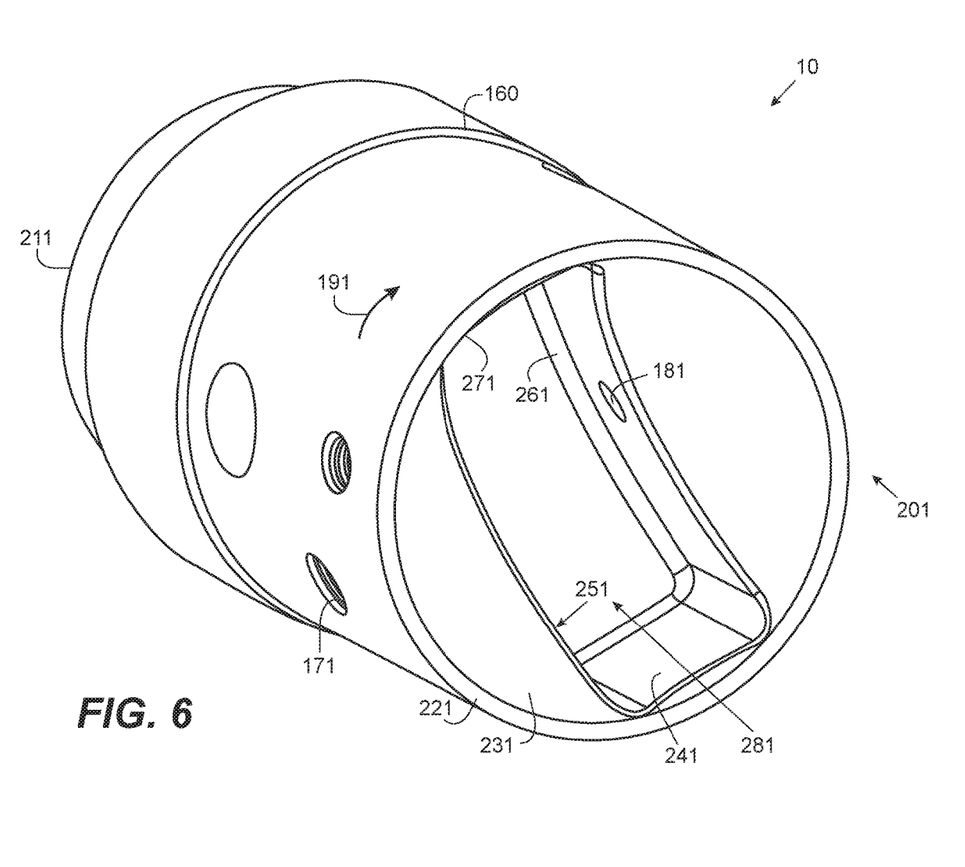
FIG. 6 is a general illustration of a preferred embodiment in accordance with the current invention depicting an output coupling of a transmission for a mud motor.

FIG. 6 is a general illustration of output coupling 160 depicting safety pin interface holes and or apertures 171 and 181, input torque rotation 191, and input thrust load 201. Output coupling 160 generally has a first end 211 for attaching to power section 50 and a second end 221 having a recessed area 231 adapted to receive second transfer coupling 140. It is contemplated that recessed area 231 generally has a torque facing such as but not limited to first side face 241, second side face 251, third side face 261, and forth side face 271. It is contemplated first side face 241 and fourth side face 271 may not carry torque.

Recessed area 231 also has a thrust face 281. It is understood in case the need to pull on the output coupling 160, axial load is reacted on the safety pin and or pin assembly 150 and associated apertures 171 and 181.

Figure 7:
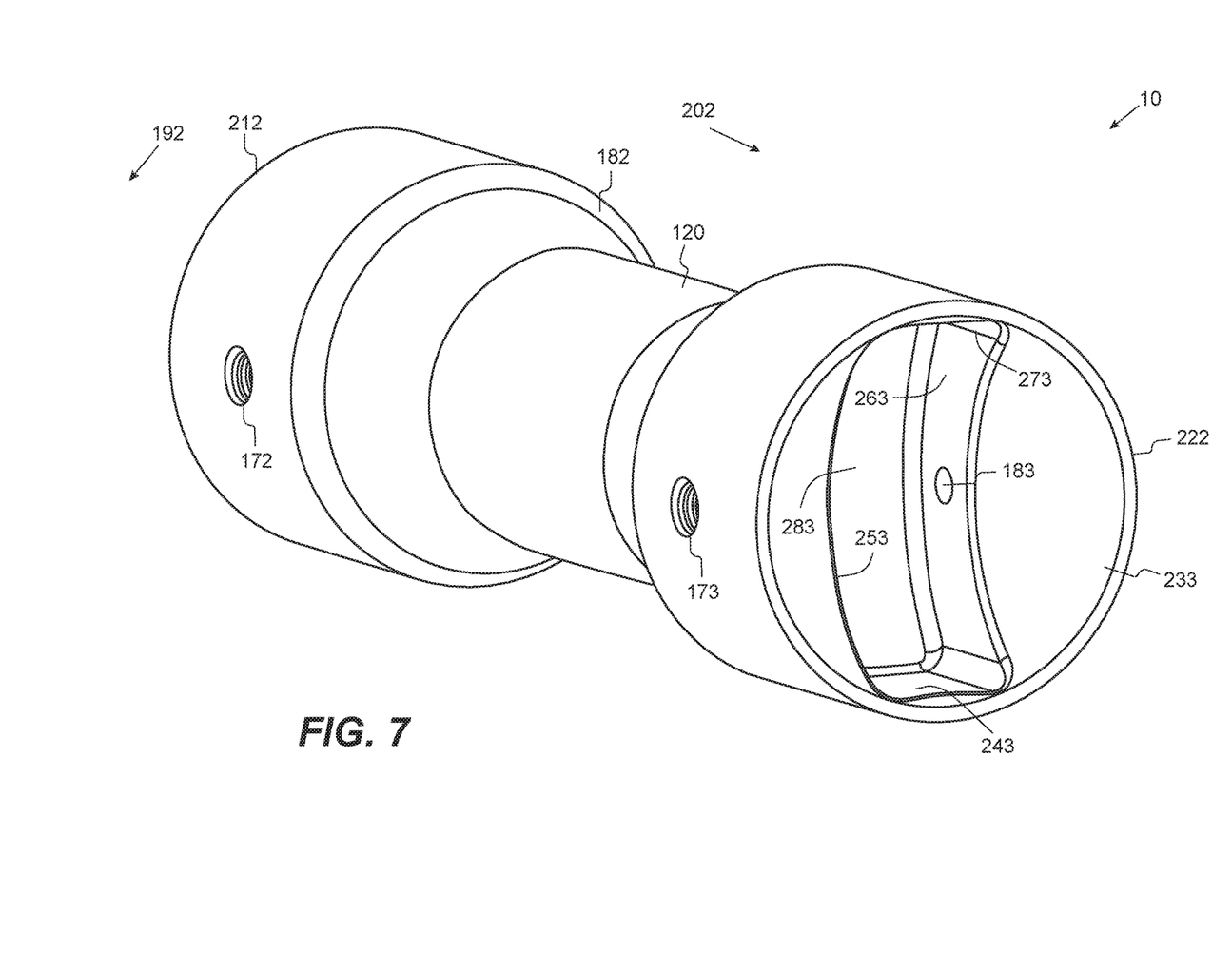
FIG. 7 is a general illustration of a preferred embodiment in accordance with the current invention depicting an intermediate shaft of a transmission for a mud motor.

FIG. 7 is a general illustration of intermediate shaft 120 with a first end 212 and a second end 222 that are the same. First end 212 generally has safety pin interface holes and or aperture 172 and 182. Input torque rotation 192 and input thrust load 202 are also depicted. Shaft 120 generally has first end 212 for attaching to first transfer coupling 100 and second end 222 to receive second transfer coupling 140. It is contemplated that first end 212 has a recessed area 232 (not depicted but same as recessed area 233), generally, having a torque facing such as but not limited to first side face 242 (not depicted but same as first side face 243), second side face 252 (not depicted but same as second side face 253), third side face 262 (not depicted but same as third side face 263), and forth side face 272 (not depicted but same as forth side face 273).

Faces 240, 270, 241, and or 271 may be arranged to allow clearance to faces 340, 360, 351, and or 371 such that the transfer couplings 100 and or 140 can rock back and forth inside recesses 230 and or 231 without the respective faces touching. Recessed area 232 also has a thrust face 282 (not depicted by the same as thrust face 283). It is understood in case the need to pull on the output coupling 160, axial load is reacted on the safety pin and or pin assembly 110 and associated apertures 172 and 182.

Second end 222 generally depicts safety pin interface holes and or aperture 173 and 183. Shaft 120 generally has second end 222 for attaching to second transfer coupling 140. It is contemplated that second end 222 has a recessed area 233, generally, having a torque facing such as but not limited to first side face 243, second side face 253, third side face 263, and forth side face 273. Area 233 also has a thrust face 283. It is understood in case the need to pull on the shaft 120, axial load is reacted on the safety pin and or pin assembly 130 and associated apertures 173 and 183.

Figure 8:
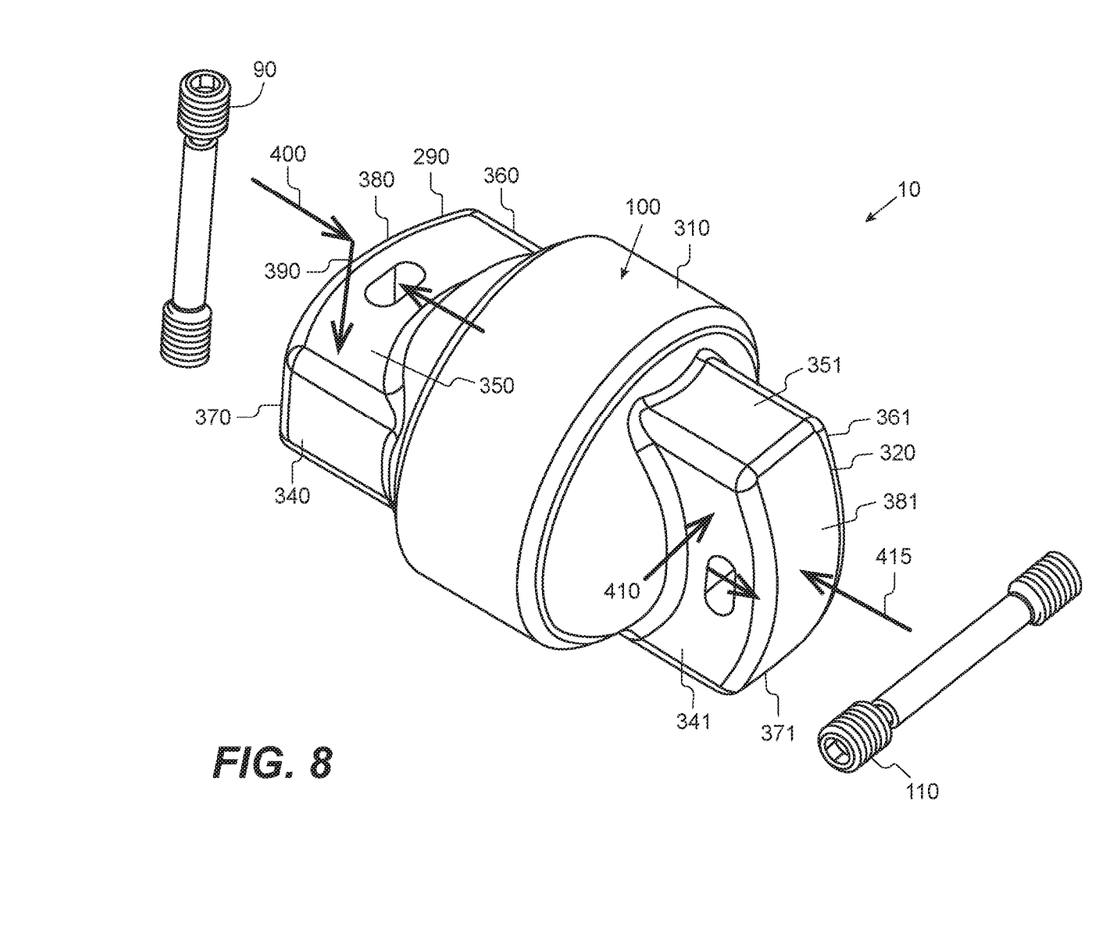
FIG. 8 is a general illustration of a preferred embodiment in accordance with the current invention depicting a load transfer coupling of a transmission for a mud motor.

Once again referring to the illustrations and more in particular to FIG. 8, first transfer coupling 100 and second transfer coupling 140 are generally the same although it is understood that differences are contemplated. First transfer coupling 100 may include a first end 290 with aperture 300, a middle section 310, and a second end 320 with aperture 330. First end 290 and second end 320 are generally the same but offset at a 90 degree angle and generally cylindrical about a common center point. This may allow the couplings to rock back and forth as the power section 50 input rotates and translates and the intermediate shaft 120 is angularly offset from both the input coupling 80 and output coupling 160. Apertures 300 and 330, also referred to as catch pin interfaces, are elongated to allow the couplings to rock back and forth without interfering with pin assembly 90, 110, 130, and or 150. Catch pins 93, 111, 131 and 151 may be held in place by two set screws threaded into input coupling 80 and or output couplings 160 respectively. It is also contemplated that pin assembly 90, 110, 130, and or 150 may be and or utilize double shear catch pins.

First end 290 may include first face 340, a second face 350, third face 360, a fourth face 370 and a thrust face 380. Second end 320 may include a first face 341, second face 351, a third face 361, fourth face 371 and a thrust face 381. In case of the need to pull on the couplings, axial load is reacted on pin assembly 90 and or 110 and associated apertures 300 and or 330. Torque input 390 and 400 are generally depicted as well as thrust input 410 and thrust input reacted 415.

Figure 9:
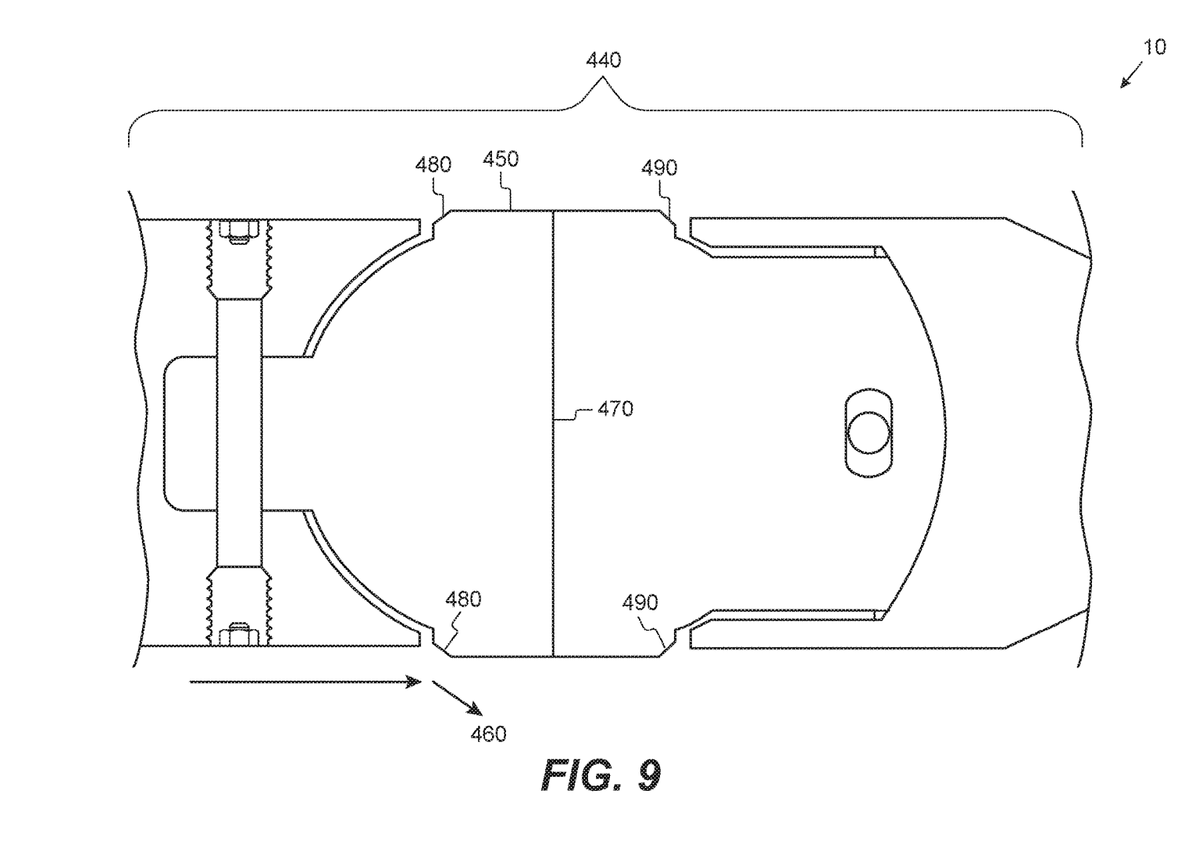
FIG. 9 is a general illustration of a preferred embodiment in accordance with the current invention depicting a transfer coupling and input coupling of a transmission for a mud motor.

Referring to FIG. 9, it is contemplated as the two torque transfer surfaces wear relative to one another, the degree of face contact in the joint assembly 420 and 430 increases, which will lower the contact pressures and stresses in the joint assembly 420 and 430. It is understood that joint assembly 420 is generally the same as joint assembly 430 although it is to be understood that differences may be utilized.

It is also contemplated invention 10 may include a cylindrical flow control 440 wherein first transfer coupling 100 and second transfer coupling 140 middle section 310 includes a cylindrical skirt 450. It is understood that as the high velocity, high pressure, and or flowing abrasives erode steel as they flow 460 over metal components. It is also known that any exposed edges will suffer higher erosion, which is a particular risk for shaft components with openings facing the direction of flow.

Invention 10 therefore contemplates providing cylindrical skirt 450 on transfer coupling 100 and 140 that may have a larger diameter 470 than the input coupling 80 diameter 471, output coupling 160 diameter 472, and or intermediate shaft 120 diameter 473. This may allow flow 460 to initially be deflected away from flow interface and or opening 480 and there to be an out of flow step at opening 490. Invention 10 further contemplates joint assemblies 420 and 430 are not sealed. This may allow flow 460 around joint assemblies 420 and 430 to wet the internal surfaces of the joints and lubricate same. It is understood that joint assemblies 420 and 430 may be sealed and combinations thereof.

Invention 10, therefore, contemplates a mud motor comprising a bearing assembly; a transmission in communication with said bearing assembly having an input coupling having a first end in communication with said bearing assembly, a second end with a recessed partial hemisphere with a slot disposed therein, and a diameter; a first torque and thrust transfer coupling having a first end with partial hemisphere with a tab disposed thereon, a second end with partial hemisphere with a tab disposed thereon, and a diameter; a first pin connecting said input coupling second end and said first torque and thrust transfer coupling first end wherein said tab pivotally communicates with said slot; an intermediate shaft having a first end with a recessed partial hemisphere with a slot disposed therein, a second end with a recessed partial hemisphere with a slot disposed therein, and a diameter; a second pin connecting said first torque and thrust transfer coupling second end and said intermediate shaft having a first end wherein said tab pivotally communicates with said slot; a second torque and thrust transfer coupling, having a first end with partial hemisphere with a tab disposed thereon, a second end with partial hemisphere with a tab disposed thereon, and a diameter; a third pin connecting said intermediate shaft second end and said second torque and thrust transfer coupling said first end wherein said tab pivotally communicates with said slot; an output coupling having a first end with a recessed partial hemisphere with a slot disposed therein, a second end in communication with said power section, and a diameter; a fourth pin connecting said second torque and thrust transfer coupling second end and said output coupling first end wherein said tab pivotally communicates with said slot; a power section in communication with said transmission; a rotor catch assembly in communication with said power section; and a cross over sub-valve in communication with said rotor catch assembly.

Invention 10 further contemplates wherein said first pin, said second pin, said third pin, and said fourth pin are double shear catch pins; wherein said diameter of said first torque and thrust transfer coupling and said diameter of said second torque and thrust transfer coupling is greater than said diameter of said input coupling; wherein said diameter of said first torque and thrust transfer coupling and said diameter of said second torque and thrust transfer coupling is greater than said diameter of said output coupling; and wherein said diameter of said first torque and thrust transfer coupling and said diameter of said second torque and thrust transfer coupling is greater than said diameter of said intermediate shaft.

Changes may be made in the combinations, operations, and arrangements of the various parts and elements described herein without departing from the spirit and scope of the invention. Furthermore, names, titles, headings and general division of the aforementioned are provided for convenience and therefore, should not be considered limiting.

What is claimed is:
1. A mud motor comprising:
a bearing assembly;
a transmission in communication with said bearing assembly having:
an input coupling having a first end in communication with said bearing assembly, a second end with a recessed partial hemisphere disposed therein, and a diameter;
a first torque and thrust transfer coupling having a first end with partial hemisphere, a second end with partial hemisphere, and a diameter;
a first pin connecting said input coupling second end and said first torque and thrust transfer coupling first end wherein said first torque and thrust transfer coupling is adapted to pivotally communicate with said input coupling;
an intermediate shaft having a first end with a recessed partial hemisphere, a second end with a recessed partial hemisphere, and a diameter;
a second pin connecting said first torque and thrust transfer coupling second end and said intermediate shaft having the first end wherein said first torque and thrust transfer coupling is adapted to pivotally communicate with said intermediate shaft;
a second torque and thrust transfer coupling, having a first end with partial hemisphere, a second end with partial hemisphere, and a diameter;
a third pin connecting said intermediate shaft second end and said second torque and thrust transfer coupling said first end wherein said second torque and thrust transfer coupling is adapted to pivotally communicate with said intermediate shaft;
an output coupling having a first end with a recessed partial hemisphere, a second end in communication with a power section, and a diameter; and
a fourth pin connecting said second torque and thrust transfer coupling second end and said output coupling first end wherein said second torque and thrust transfer coupling is adapted to pivotally communicate with said output coupling;
said power section in communication with said transmission;
a rotor catch assembly in communication with said power section; and
a cross over sub-valve in communication with said rotor catch assembly.

2. The mud motor of claim 1 wherein said first pin, said second pin, said third pin, and said fourth pin are double shear catch pins.

3. The mud motor of claim 1 wherein said diameter of said first torque and thrust transfer coupling and said diameter of said second torque and thrust transfer coupling is greater than said diameter of said input coupling.

4. The mud motor of claim 1 wherein said diameter of said first torque and thrust transfer coupling and said diameter of said second torque and thrust transfer coupling is greater than said diameter of said output coupling.

5. The mud motor of claim 1 wherein said diameter of said first torque and thrust transfer coupling and said diameter of said second torque and thrust transfer coupling is greater than said diameter of said intermediate shaft.

6. A transmission for a motor comprising:
an input coupling having a first end, a second end with a recessed partial hemisphere, and a diameter;
a first torque and thrust transfer coupling having a first end with partial hemisphere, a second end with partial hemisphere, and a diameter;
a first pin connecting said input coupling second end and said first torque and thrust transfer coupling first end wherein said first torque and thrust transfer coupling is adapted to pivotally communicate with said input coupling;
an intermediate shaft having a first end with a recessed partial hemisphere, a second end with a recessed partial hemisphere, and a diameter;
a second pin connecting said first torque and thrust transfer coupling second end and said intermediate shaft having the first end wherein said first torque and thrust transfer coupling is adapted to pivotally communicate with said intermediate shaft;
a second torque and thrust transfer coupling, having a first end with partial hemisphere, a second end with partial hemisphere, and a diameter;
a third pin connecting said intermediate shaft second end and said second torque and thrust transfer coupling said first end wherein said second torque and thrust transfer coupling is adapted to pivotally communicate with said intermediate shaft;

an output coupling having a first end with a recessed partial hemisphere, a second end, and a diameter; and a fourth pin connecting said second torque and thrust transfer coupling second end and said output coupling first end wherein said second torque and thrust transfer coupling is adapted to pivotally communicate with said output coupling.

\* \* \* \* \*